July 25, 1961    J. J. FRANKLIN    2,993,345
FREEZER APPARATUS
Filed June 26, 1959    3 Sheets-Sheet 1
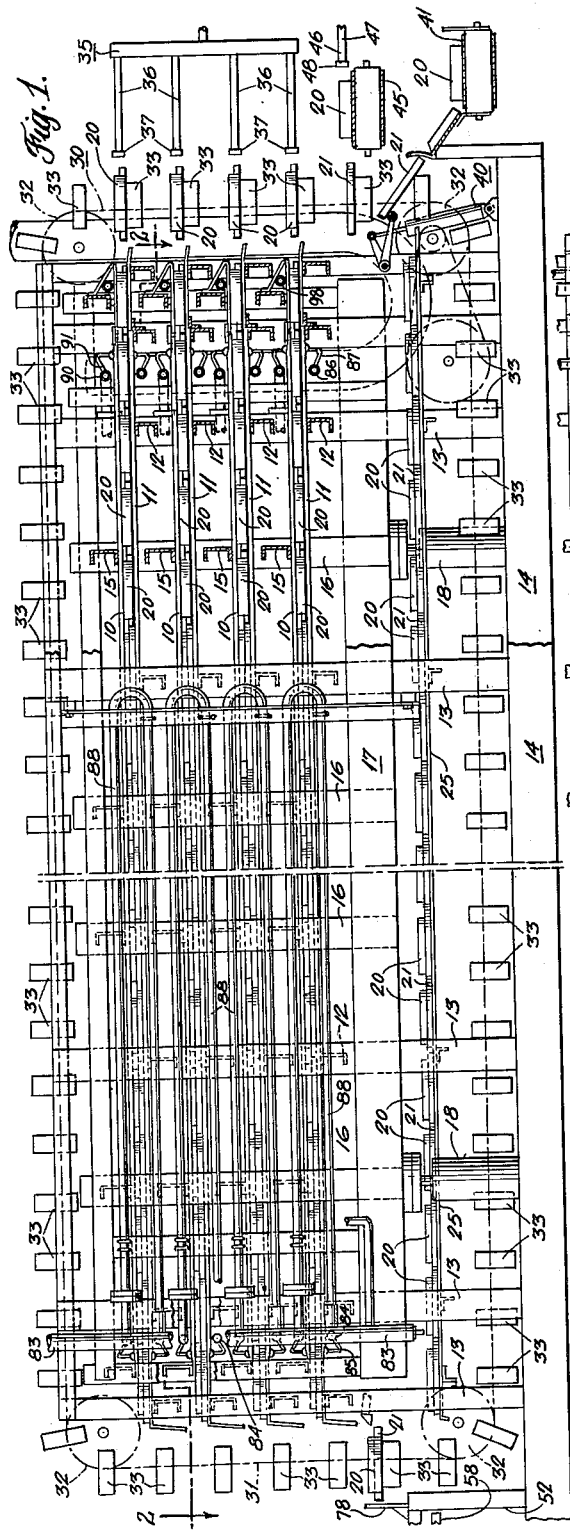
INVENTOR:
JOHN J. FRANKLIN
BY Howson & Howson
ATTYS.

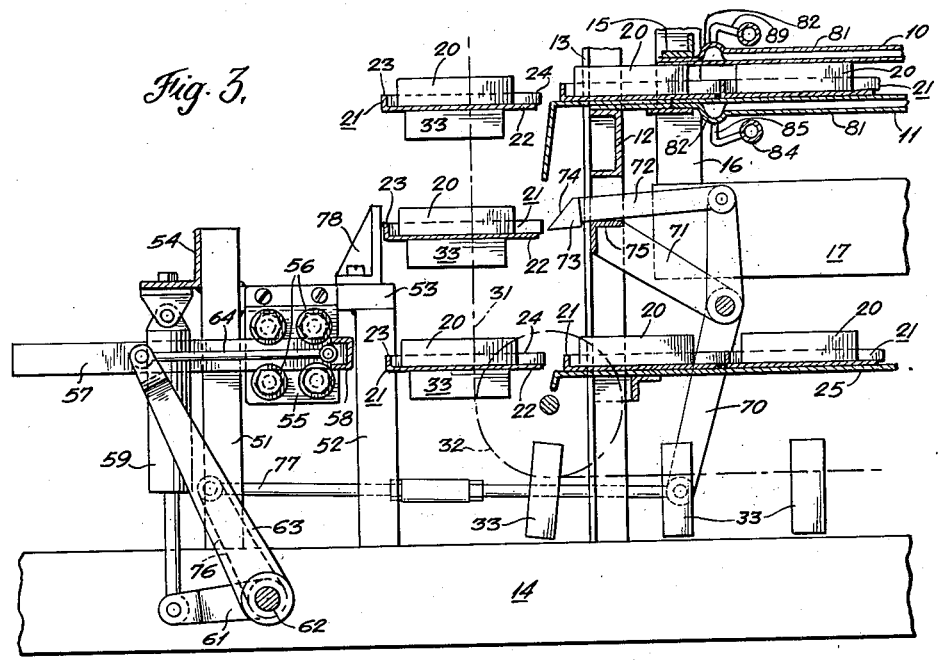

July 25, 1961  J. J. FRANKLIN  2,993,345
FREEZER APPARATUS
Filed June 26, 1959  3 Sheets-Sheet 3

INVENTOR:
JOHN J. FRANKLIN
BY Howson & Howson
ATTYS.

United States Patent Office 2,993,345
Patented July 25, 1961

2,993,345
FREEZER APPARATUS
John J. Franklin, Glenside, Pa., assignor to Patterson Freezer Corporation, Philadelphia, Pa., a corporation of Pennsylvania
Filed June 26, 1959, Ser. No. 823,178
15 Claims. (Cl. 62—63)

This invention relates to freezing of food packages, and more particularly to an improved method and apparatus for freezing food packages.

In the freezing of food packages it has been the practice to employ apparatus comprising a pair of opposing plates which are alternately brought together and separated to compress and freeze therebetween a full complement of food packages. During separation of the plates all of the frozen food packages are removed from between the plates and a new complement of unfrozen packages is inserted.

In the application of Velt C. Patterson, Serial No. 599,673, filed July 16, 1956, now Patent No. 2,910,837, which application is a continuation-in-part of his application Serial No. 461,836 filed October 12, 1954, now abandoned, there is disclosed improved freezer apparatus affording continuous operation of a freezing unit and which automatically feeds packages to the unit, alternately compresses and advances the packages between the plates stepwise through the unit to freeze the same, and then discharges them.

In my copending application Serial No. 823,185, filed June 26, 1959, there is disclosed a system and apparatus which may be used to load and unload food packages in freezer apparatus of the type described in the above-mentioned application of Velt C. Patterson in an improved manner. Apparatus of my copending application advantageously provides for supporting of articles to be treated on trays, and for recirculation of the trays within the apparatus.

Freezer apparatus of the type disclosed in the above-identified patent, in addition to having the advantage of providing for freezing of food packages in a continuous operation with a minimum of supervision, overcomes the problem of jamming by packages becoming frozen to the plates during the freezing operation for most types of food packages by reason of the fact that the apparatus positively displaces the packages during operation. Even though this apparatus is thus free from jamming by most types of food packages, food packages introduced thereto containing foods at elevated temperatures have a tendency to become frozen to the freezer plates. For example, apparatus of the type to which the aforesaid application is directed is particularly useful in freezing food packages comprising a complete dinner on an aluminum tray. In certain of such dinners, one of the vegetables may be mashed potatoes. Food processing standards require that mashed potatoes be placed on a tray at a temperature of at least 150° F., and preferably 180° F. to minimize bacteria growth. The tray is then covered with aluminum foil and immediately introduced to the freezer. The freezer plates generally are maintained at a temperature of the order of −40° F. to effect rapid freezing of the dinners and are covered with a layer of frost produced by condensation and freezing of atmospheric moisture. When the freezer plates engage a newly introduced dinner containing hot mashed potatoes, a portion of the frost layer on the freezer plates in direct contact with the hot tray initially melts and then refreezes during the initial compression of the tray between the plates, whereby the dinner tray tends to stick to the freezer plate so tightly as to be difficult to dislodge in spite of the positive displacement feature of the freezer.

Another type of food package which has a tendency to stick to freezer plates is that containing very hot liquids such as hot gravy. Packages of this type cause frost deposits on the plates to melt and refreeze causing the packages to be attached to the freezer plates.

Prevention of freezing of food packages of the above type to the bottom freezer plate of each pair of freezer plates between which the food packages are alternately compressed and advanced stepwise may be overcome by placing the food packages on heavy metal trays designed to hold a plurality of food packages. However, in time ice deposits may build up on the trays by which the packages may firmly adhere to the trays by the melting and freezing phenomenon discussed above.

A primary object of the present invention is to provide an improved plate-type freezer for continuous, automatic freezing of food packages and which obviates the problem of packages containing food at elevated temperatures from becoming frozen to the plates.

Another object of this invention is the provision of improved freezing apparatus of the type where opposed plates are alternately brought together and separated to compress and freeze therebetween food packages in which novel freezer plates are employed to overcome the tendency of hot food packages to freeze thereto.

A further object of this invention is to provide a novel method of quick freezing hot food packages to eliminate freezing of the packages to the cold surfaces of a freezer with which they come in contact.

Still another object of this invention is the provision of novel means of automatically separating frozen food packages from trays on which they are circulated through plate-type freezer apparatus.

These and other objects of this invention and the various features and details of the construction and operation thereof are more fully set forth hereinafter with reference to the accompanying drawings wherein:

FIG. 1 is a sectional elevational view of freezer apparatus embodying the present invention, the section being taken on the line 1—1 of FIG. 2, and the view being partly broken out to condense the figure;

FIG. 2 is a plan section of freezer apparatus embodying the invention with a portion thereof broken out to condense the figure, the section being taken on the line 2—2 of FIG. 1;

FIG. 3 is an enlarged sectional elevation of means according to this invention for separating frozen food packages from carrier trays to which the packages may become frozen during their progress through the freezer, the means being in the at rest position, and the section being taken along the line 3—3 of FIG. 4;

FIG. 4 is a partial plan section of the means for separating frozen food packages from carrier trays illustrated in FIG. 3;

Figure 5:
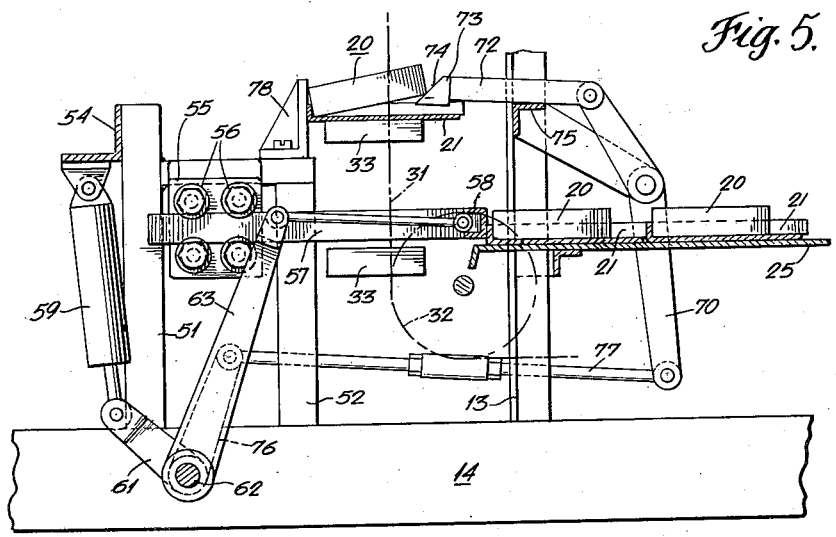
FIG. 5 is an enlarged sectional elevation of means for separating frozen food packages from carrier trays, and is similar to FIG. 3 with the exception that the means has been actuated to engage the frozen food packages on the tray.

Referring to the drawings, wherein similar elements are designated by the same number, and more particularly to FIGS. 1 and 2, there is illustrated a plate-type freezer having a plurality of vertically spaced pairs of freezer plates, each pair comprising an upper plate 10 and a lower plate 11. Four pairs of freezer plates are illustrated, however, the number of pairs of freezer plates may be increased or decreased, depending upon the desired rate of production of the freezer, available space, and like considerations. Freezer plates 11 are stationary and are rigidly mounted in a supporting framework formed of U-shaped cross beams 12, the ends of which are rigidly attached to stanchions or posts 13. The lower ends of stanchions 13 are securely fastened to a pair of longitudinally extending base support members 14, one of which is shown. Base support members are anchored to the floor in the area in which they are installed in any well known manner to prevent movement.

The upper freezer plate 10 of each pair of freezer plates is mounted on a rigid framework comprising U-shaped cross beams 15 the ends of which are rigidly attached to posts 16. Posts 16 on each side of the freezer have their lower ends fixedly mounted on a pair of longitudinally extending beams 17, only one of which is shown. Each longitudinally extending beam 17 is supported by a pair of hydraulic cylinders 18, by means of which the entire framework for supporting the upper carrier plates 10 may be reciprocated in a vertical direction to cause each of the upper freezer plates 10 to be disposed simultaneously in a relatively open or a relatively closed position with respect to stationary freezer plates 11. Obviously lower freezer plates 11 could be made to reciprocate and upper plates 10 made stationary merely by supporting plates 11 by cross-beams 15 and plates 10 by cross-beams 12. Similar relative movement of the plates 10 and 11 with respect to each other could thus be achieved. The distance between each pair of freezer plates 10 and 11 in the closed position should provide for a small amount of compressive force on the food packages disposed therebetween without rupture of the packages in order to effect more rapid freezing of the packages. Freezer plates 10 and 11 are ordinarily made of steel and are relatively smooth surfaced in order to minimize friction between food packages and their supporting trays as they progress therebetween.

In FIG. 1 each pair of freezer plates 10 and 11 is shown as being disposed in the relatively closed position in order to compress and freeze the food packages 20 supported on trays 21 therebetween. Between each pair of freezer plates there is a full complement of trays, each supporting a plurality of food packages, and the trays are disposed in successively abutting relation.

Unfrozen food packages on trays 21 are introduced at the right hand end of the freezer apparatus and discharged from the left hand end. Refrigerant is introduced into the freezer plates in the manner hereinafter described so as to flow in a direction opposite to the direction of movement of the food packages through the freezer.

Extending completely about the series of vertically spaced pairs of freezer plates is a conveyor 30 which functions to present unfrozen food packages 20 on trays 21 at a plurality of levels in alignment with the entry end of freezer plates 10 and 11 for introduction therebetween, and to receive frozen food packages from between the freezer plates at a plurality of levels at the opposing discharge end of the freezer. The conveyor is illustrated as having a right hand up run and left hand down run at opposing ends of the freezer plates, the conveyor being operated in a counterclockwise direction. Conveyor 30 comprises right and left hand chains 31, indicated by the dot and dash line in FIGS. 1, 3 and 5, which are driven at the same linear speed over four opposing sets of sprockets 32, one set of which is connected to a suitable drive mechanism, not shown. Extending between chains 31 are a plurality of equally spaced, rigid cross bars 33 of generally rectangular cross section. The cross bars are approximately the same length as the width as the carrier plates 10 and 11 so as to enable them to support the same number of articles on a tray as may be accommodated in a transverse direction by freezer plates 11. These cross bars are so connected to chains 31 as to present flat tray-supporting surfaces in the up and down runs of the conveyor. The distance between the flat tray-supporting surfaces of adjacent cross bars is substantially equivalent to the distance between the load carrying surfaces of adjacent freezer plates 11. Thus, the cross bars can be brought into alignment with the freezer plates 11 in the up and down runs so that the tray-supporting surfaces of the cross bars function as an extension of the plates at each end of the latter.

Beneath the freezer plates 10 and 11 is a carrier plate or shelf 25 which is so located that each end thereof is confronted by the up and down run of conveyor 30, and a cross bar in each run is in registry therewith when the cross bars in these runs are also in registry with freezer plates 11. Thus, a cross bar in each of the up and down runs of conveyor 30, in substance, forms a continuation of each end of carrier plate of shelf 25 to effect tray recirculation in the manner hereinafter described.

Situated between each pair of freezer plates 10 and 11 are transversely extending rows of food packages, each row supported by a tray 21. As can be seen more clearly with reference to FIG. 3 the trays comprise a flat bottom portion 22 for supporting the food packages, an upwardly extending flange 23 along one longitudinally extending edge of the tray to prevent articles introduced to the trays in a manner hereinafter described from overhanging the supporting base thereby interfering with movement of the conveyor 30, and stiffening end bars or thrust members 24.

Each of the cross bars 33 in the up run of the conveyor 30 is in alignment with a freezer plate 11 and contains a tray loaded with unfrozen food packages. The cross bars on the down run of the conveyor, however, are empty, with the exception of the cross bar in the next to the bottom position (see FIG. 1).

To the right of the up run of conveyor 30 is a loading ram or main multiple pusher 35 comprising a framework mounted for translational motion by suitable means, such as one or more pressure cylinders, not shown. Forming part of the framework and disposed at each freezer plate level are outwardly projecting pairs of arms 36 having mounted therebetween an elongated abutment 37 for engaging the tray stiffening thrust members 24 of the trays. These abutments are in vertical alignment so that when the loading ram is advanced, the loaded trays at all levels are simultaneously displaced between each pair of freezer plates 10 and 11. In addition, this action of the main multiple pusher pushes all of the trays along freezer plates 11, each pair of freezer plates 10 and 11 being in the open position, one step equal in amplitude to the width of a single tray, and in so doing the leading left hand tray of each full complement of trays between each pair of freezer plates 10 and 11 is displaced onto a cross bar 33 of the down run of conveyor 30.

Located adjacent the lowermost cross bar in the up run of conveyor 30 is a tray tilting mechanism 40 by means of which frozen food packages are displaced from a tray on the cross bar and slide onto an outfeed or discharge conveyor belt 41. This tray tilting mechanism which is described in detail in my copending application Serial No. 823,185, filed June 26, 1959, operates during the lull in the intermittent motion of conveyor 30.

Unfrozen food packages are delivered to the infeed end of the freezer by means of a line conveyor infeed belt 45. This belt operates in such a manner as to deliver a full complement of unfrozen food packages into position for displacement onto an empty tray on a cross bar of the up run of conveyor 30. When such a full complement of such packages on conveyor 45 is aligned between the ends of a tray on the cross bar in registry with the infeed belt, the food packages are displaced from the infeed belt during a lull in the intermittent motion of both the infeed belt 45 and conveyor 30, by means of an infeed pusher 46 comprising a pair of rams 47 having extending between their ends an elongated bar 48 for engaging the articles on the infeed belt. Reciprocation of the infeed pusher may be caused by means of a pair of hydraulic cylinders, not shown. Various infeed conveyor systems including means for actuating the infeed pusher upon delivery of a tray load of packages are disclosed in my copending application referred to hereinabove.

Located at the discharge end of the freezer is a pusher mechanism for effecting return of trays on which food packages are conveyed through the freezer back to the entry end of the freezer. Referring more particularly to FIGS. 3–5, the pusher mechanism is supported by a suitable framework comprising a pair of posts 51 and 52 on each side of the freezer, posts 51 and 52 being connected by a beam 53. The lower ends of posts 51 and 52 on each side of the freezer are rigidly attached to longitudinally extending base supporting beams 14. Extending transversely of the freezer is an angle iron 54 having each end thereof attached to the upper ends of posts 51. A bracket 55, to which are attached four roller elements 56, is mounted on each of beams 53. A pair of rods 57, the forward ends of which are connected by a pusher bar 58, slidingly engage the roller elements 56. Pusher bar 58 is at the level of carrier plate or shelf 25 and when urged forward will engage a tray 21 on a cross bar 33 which is in registry with carrier plate 25. Pusher bar 58 is provided with translational motion by means of a pair of linear fluid motor 59 pivotally mounted to angle iron 54, each ram of which is connected to a lever arm 61 which is pivotally mounted on shaft 62. Also, pivotally mounted on a shaft 62 are lever arms 63; lever arms 61 and 62 thus act as a pair of bell cranks at each side of the freezer. Lever arms 63 are connected to pusher bar 58 by a pair of rods 64. As can be seen with reference to FIG. 5, actuation of the rams in an upwardly direction causes the pusher bar to be urged forwardly so as to engage a tray containing frozen food packages on the lowermost cross bar of the down run of conveyor 30, which cross bar is in registry with shelf 25, and displaces the tray onto shelf 25 where it engages the last tray of the complete complement of trays, whereby the entire complement of trays is advanced the width of a single tray and the leading tray is displaced onto the cross bar in the lowermost position of the up run of the conveyor which is in registry with carrier plate 25 (see FIG. 1).

The tray return pusher operates during each lull in the intermittent motion of conveyor 30 to effect return of the trays from the discharge end of the freezer to the entrance end of the freezer where frozen food packages are removed from the trays by the tilting mechanism, heretofore described, and the empty tray is again filled with unfrozen food packages.

As stated previously, one of the problems involved in freezing food packages which initially contain foods at substantially elevated temperatures by circulating them through a plate-type freezer on trays is that the hot food packages, upon initial contact with the trays, melt the frost deposit on the trays and the packages subsequently become tightly adhered to the trays by refreezing of the frost deposit during passage of the trays through the freezer. In order to break the frost seal between the frozen food packages and the trays, this invention contemplates a nudger bar which exerts pressure on the frozen food packages at the frost interface between the packages and their supporting tray.

Referring more particularly to FIGS. 3–5, there is there illustrated means for breaking the frost bond between the frozen food packages and their supporting tray which comprises a pair of linkages 70, only one of which is shown, each of which is pivotally mounted on a shaft supported by a pair of arms 71 each of which is rigidly attached to a stanchion 13 at each side of the discharge end of the freezer. To the upper arm of each linkage 70 there is pivotally mounted a bar 72, the ends of which are connected by means of a nudger bar 73 which has a sloping face 74. Bars 72 ride on angle iron 75. The lower end of each lever arm of linkages 70 is connected to a lever arm 76 on shaft 62 by means of a connecting rod 77. Lever arm 76 which when taken with lever arm 61, which is attached to the ram of the linear fluid motor acts as a bell crank.

Referring to FIG. 5, it can be seen that actuation of the ram of fluid motor 59 in an upwardly direction causes tapered nudger bar 73 to engage the frozen food packages 20 on tray 21 and break the frost seal by which the packages may be firmly adhered to the tray. The breaking of the frost seal is caused by the tapered surface 74 of the pusher bar 73, which when it engages the packages causes them to ride up on the tapered surface. Also, as the upper lever arm of linkage 70 is moved forward, its effective length is shortened causing the bars 72 to pivot on angle iron 75 whereby the nudger bar is somewhat elevated. Displacement of tray 21 from cross bar 33 by means of nudger bar 73 is prevented by means of a pair of abutments 78.

In the arrangement illustrated in FIGS. 3–5, the nudger bar 73 and the tray return pusher bar operate simultaneously by means of linear fluid motor 59; however, they may be operated separately, and by mechanical rather than hydraulic means.

Operation of the apparatus illustrated in the figures, with the exception of the manner in which refrigerant is provided to the freezer plates, hereinafter discussed, is as follows. Each of the cross bars 33 of the up run of conveyor 30 is illustrated as supporting a tray 21 containing a full complement of unfrozen food packages. At this stage of the operation, which is during a lull in the intermittant motion of conveyor 30, main multiple pusher 35 is actuated and the elongated abutments 37 engage trays 21 on cross bars 33 and displace them simultaneously between each pair of freezer plates 10 and 11, which during each lull in the intermittent motion of conveyor 30, are in the open position. The trays displaced from the cross bars of the up run of conveyor 30 engage the last tray of each full complement of trays between each pair of freezer plates whereby the entire complement of trays at each level is advanced the width of a single tray. In so doing, the leading tray of each full complement of trays between each pair of freezer plates 10 and 11 is displaced onto an empty cross bar 33 of the down run of conveyor 30.

At the time multiple pusher 35 is actuated, the infeed pusher 46 and the tray return pusher bar 58 may also be actuated, or they may be actuated in a given sequence, but during the same lull in the intermittent motion of conveyor 30. The infeed pusher displaces a full complement of unfrozen packages from infeed conveyor 45 onto an empty tray 21 supported on a cross bar 33 of the up run portion of conveyor 30, and the tray return pusher bar 58 displaces a tray containing a full complement of frozen food packages from the cross bar in the bottom-most position of the down run of the conveyor onto the return carrier plate 25. This latter tray engages the last tray in the full complement of trays on carrier plate 25, whereby the entire complement of trays is advanced a distance equal to the width of one tray, and the leading tray of the complement is displaced onto the empty cross bar in the bottom-most position of the up run of the conveyor 30. The articles are then displaced from this tray by tray tilting mechanism 40.

In FIG. 1, the operation of the apparatus is at that point prior to actuation of main multiple pusher 35 and infeed pusher 46. Tray return pusher bar 58 has just been actuated, and the tray displaced onto the cross bar in the bottom-most position of the up run portion of conveyor 30 is shown as being tilted by tray tilting mechanism 40.

Referring to FIG. 5, at the same time tray return pusher bar 58 is actuated, nudger bar 73 is also advanced to engage frozen food packages on a tray on the cross bar next to the bottom-most cross bar in the down run of conveyor 30, whereby the frost bond between the frozen food packages and the supporting tray 21 is broken to free the packages.

The conveyor 30 is then advanced one step, the drive mechanism for conveyor 30 being actuated by means, not shown, responsive to completion of the cycle of operation of the various pushers, etc. For example, infeed pusher 46 may trip a switch, not shown, to advance the conveyor one step. During the subsequent lull in the intermittent motion of conveyor 30 a full tray load of unfrozen food packages is again displaced onto a tray on the up run portion of the conveyor, which tray was emptied of frozen food packages during the previous lull in the intermittent motion of conveyor 30. A tray loaded with treated articles is also displaced from the cross bar in the bottom-most position of the down run of conveyor 30 and onto return carrier plate 25, thereby displacing the leading tray of the full complement of trays on carrier plate 25 onto the cross bar into the bottom-most position of the up run of the conveyor, which tray is then tilted by tray tilting mechanism 40. In addition, nudger bar 73 again frees frozen food packages from the tray supported on the cross bar which is in the next to the bottom position in the down run of conveyor 30.

The operation of the apparatus described in the immediately preceding paragraph is repeated during each lull in the intermittent motion of conveyor 30, main multiple pusher 35 operating during each fourth lull, at which time there is a tray loaded with unfrozen food packages in registry with each of the pairs of freezer plates.

During movement of conveyor 30, freezer plates 10 and 11 assume the closed position to compress and freeze the food packages therebetween.

According to this invention there is also provided method and apparatus which overcomes the problem of freezing food packages containing foods at substantially elevated temperatures, for example temperatures as high as 180° F. or higher. As was stated previously, the freezer plates have a surface film of frost which, when contacted with hot packages, initially melts and then refreezes whereby the packages newly introduced to the freezer may become tightly bonded to the freezer plates resulting in jamming of the freezer.

This difficulty is obviated by a novel method and apparatus for use therein, which method comprises maintaining a temperature difference between a first zone comprising the entrance end of the freezer plates and a second zone extending for a substantial length from the first zone to the discharge end of the freezer. The temperature in the first zone is higher than the second zone, the latter zone being at a temperature sufficiently low to effect freezing of the food package. With this novel procedure moisture in the air within the enclosure wherein the freezer is located is selectively condensed and frozen on that portion of the plates in the second zone, the plates in the first zone being substantially free of moisture or frost. The temperature of the first zone is sufficiently low to cool the food package to a temperature which is insufficient to melt the frost layer on the surface of the freezer plates in the second zone wherein the food packages are frozen. Expressed another way, the surface of the hot food packages should be cooled in the first zone to a temperature below about 90° F.

The first zone should be of sufficient size to accommodate a newly introduced hot food package and may be large enough to accommodate two or more food packages in substantially abutting relation, whether supported on trays or not. The second zone is of sufficient length and maintained at a low enough temperature to effect freezing of the food packages prior to their discharge from the freezer. It is obvious that it is difficult to give exact dimensions for the two zones, for the rate at which the packages are advanced through the freezer, the temperatures of the respective zones and the number of times the packages are compressed between the freezer plates in passage through the freezer will have considerable bearing on the size of these zones. Thus, the dimensions given above are only approximate and suitable for a certain limited range of temperatures and speeds of advancement of the packages through the freezer. Nevertheless, having been provided with the above teaching according to this invention, a person skilled in the art can apply the teaching in carrying out the method and in designing freezer apparatus to embody it, thereby obtaining the advantages of the invention.

The temperature of the first zone into which hot food packages are introduced will depend to a large degree upon the temperature of the entering food packages and residence time of the packages in the zone. If the packages are at substantially elevated temperatures, e.g. 125°–180° F. or higher, the freezer plates in the first zone may be maintained at a temperature of from about −20° to about 50° F. to effectively cool the surface of the hot packages in a relatively short residence time to prevent freezing of the packages to the plates in the second colder zone. For the same residence time, temperatures in the lower part of this range preferably are employed if the packages introduced thereto have a very high temperature, such as 150° F. or higher, whereas temperatures in the upper portion of the range are satisfactory for food packages having somewhat lower temperatures, for example 150° F. or less. Of course, colder temperatures may be employed to permit use of a shorter residence time in the first zone. A preferred temperature in the first zone when the packages introduced are at a temperature of about 140°–160° F. is about −10° to 10° F.

The temperature of the freezer plates in the second zone is lower than the temperature in the first zone and should be sufficiently low to freeze the food packages during passage of the packages therethrough. Ordinarily temperatures below about −10° F., and preferably from about −20° to about −50° F. are employed in order to obtain relatively high production rates. A temperature difference between the first and second zone of at least 10° F. is preferred.

Figure 6:
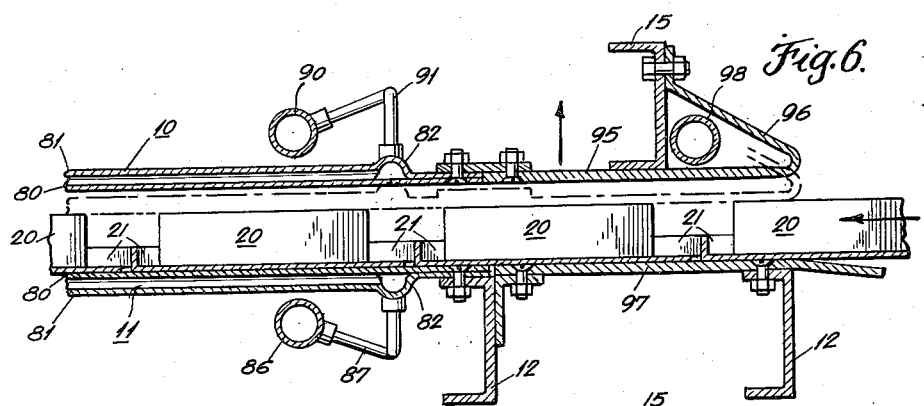
FIG. 6 is an enlarged sectional view of the entry end of a pair of freezer plates embodying the present invention.
Figure 7:
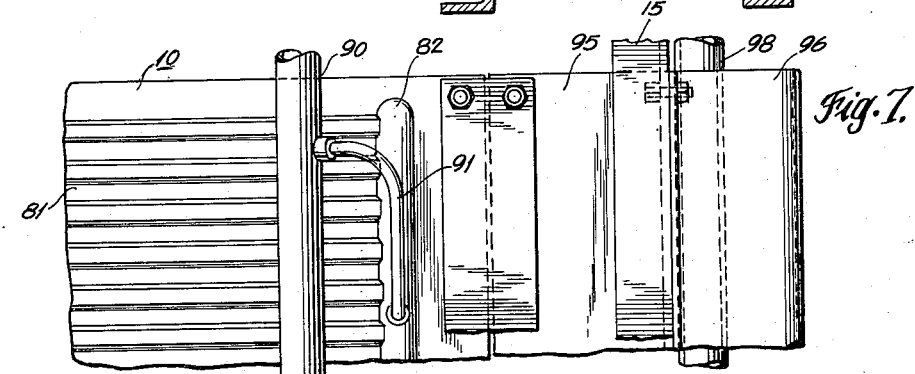
FIG. 7 is a partial plan section of the entry end of an upper reciprocating freezer plate of this invention.

Referring to FIGS. 1, 2, 6 and 7, and particularly to FIGS. 6 and 7, there are illustrated novel freezer plates embodying this invention. Each freezer plate 10 and 11 comprises a smooth-surfaced relatively flat plate 80, between which the food packages are advanced, and compressed, to which are welded corrugated plates 81, the corrugations of which extend longitudinally of the freezer plates and terminate at each end in manifold portions 82. Each freezer plate may be provided with a single corrugated plate 81, or a plurality of such corrugated plates in side-by-side relation, each corrugated plate having manifold portions at each end (see FIG. 2).

Refrigerant is delivered to plates 10 and 11 by suitable pump means, not shown, through a vertical conduit 83 at the discharge end of the freezer, and is removed from the freezer plates by a similar conduit located toward the entrance end of the freezer, but not shown in the drawings. Refrigerant is carried from vertical conduit 83 to stationary plates 11 by means of a plurality of conduits 84 which extend transversely of the freezer at the discharge end and are connected to the manifolds 82 of stationary plate 11, at the discharge end of the freezer, by means of pipes 85. Refrigerant, after passing longitudinally of freezer plates 11 through the plurality of conduits formed by means of corrugated plate 81, is removed therefrom toward the entry end of the freezer by a similar arrangement of transverse conduits 86 connected to manifolds 82 by means of pipes 87 (see FIG. 6).

Refrigerant is introduced to and removed from upper reciprocating freezer plates 10 in a manner generally similar to that in which refrigerant is introduced and removed from lower stationary plates 11, with the exception that vertical conduit 83 for delivering refrigerant is connected to transversely extending conduits 87 (see FIG. 2) by means of generally U-shaped conduits 88 which are employed to minimize cold working of the material, generally metal, from which they are formed in reciprocation of the upper freezer plates 10. Minimizing cold working of metal conduits 18 is obtained in a relatively simple manner by use of substantial length of parallel pipe joined at one end by a curved portion to form U-shaped conduits 88. One end of one of the long parallel pipes is connected to the framework for reciprocating the upper plates 10. Since the vertical movement of this end of the pipe is relatively small, e.g. may be less than one inch, whereas the parallel pipe sections may be many feet in length, cold working of the U-shaped conduits 88 at the curved portions thereof is essentially negligible. Transverse conduits 87 are connected to manifolds 82 at the discharge end of freezer plates 10 by means of a plurality of pipes 89. Refrigerant is removed from reciprocating upper freezer plates 10 by a similar arrangement of parts as used in introducing refrigerant to the plates. In other words, refrigerant from each manifold 82 located toward the entry end of the freezer is connected to transverse conduits 90 by means of pipes 91 (see FIGS. 6 and 7). Transverse conduits 90 are then connected to U-shaped tubes similar to tubes 88, one end of the tubes being connected to a vertical conduit similar to conduit 83 for return of refrigerant to the compressor.

As can be seen particularly with reference to FIGS. 6 and 7, a portion of each freezer plate 10 and 11 comprising the entry end of the freezer is not refrigerated in the manner previously described. Rather, each upper freezer plate 10 has an entry portion which comprises a metal plate 95 having a flange 96 for securing it to a cross beam 15. Each stationary freezer plate 11 has an entry portion opposite the entry portion of freezer plates 10, which merely comprises a flat plate supported by beams 12. No means is shown for refrigerating plate 97, however, flanged plate 95 is shown as being provided with a conduit 98 which extends transversely of freezer plate 10 through which refrigerant may be supplied to cool the plate to the desired temperature range. Of course, plate 97 may be cooled by the same or similar refrigerating means as plate 95. Also neither plate 95 nor 97 need be provided with refrigeration means such as conduit 98; however, it is apparent that plates 95 and 97 may be cooled to the desired temperature range by reason of their proximity to the refrigerated portions of plates 10 and 11.

By reason of the fact that the entry portions of freezer plates 10 and 11 comprising plates 95 and 97, respectively, are not provided with refrigerating means, or are refrigerated by means such that pipe 98, which provides for relatively little refrigeration as compared to the remainder of the freezer plates, they are at a substantially higher temperature than the portions of the plates through which the bulk of refrigerant is passed.

By means of the apparatus illustrated in the figures, the surfaces of hot packages introduced and compressed between plates 95 and 97 of freezer plates 10 and 11, are merely cooled, to a temperature sufficiently low so that when the packages are advanced into the very cold portions of freezer plates 10 and 11, through which refrigerant is circulated, they will not melt the frost on the plates and become adhered to the plates on refreezing of the melted frost.

While there have been shown and described certain particular embodiments of the invention, it will be obvious to those skilled in the art that changes and modifications may be made without departing from the invention, and that it is intended by the appended claims to cover all such changes and modifications as fall within the true spirit and scope of the invention.

What is claimed is:

1. In a process for freezing food packages which are at elevated temperatures, and in which the food packages are advanced between a pair of freezing plates mounted for movement relative to one another between relatively open and closed positions and permitting stepwise advancement of the packages in the open position and compressing and freezing the packages in the closed position, the steps which comprise maintaining a temperature difference between a first zone comprising the entrance end of said freezing plates and a second zone extending from said first zone toward the discharge end of said freezing plates, the temperature in said second zone being less than the temperature of said first zone and sufficiently low to freeze food packages during passage therethrough, introducing food packages at elevated temperatures between said freezing plates in said first zone and compressing said packages between said plates, said surface of said packages being cooled in said first zone to a temperature insufficient to melt frost on said freezing plates in said second zone, and advancing said cooled packages stepwise through said second zone to freeze said packages.

2. The process according to claim 1 in which said first zone is maintained at a temperature of from about −20 to about 50° F.

3. The process according to claim 1 in which said first zone is maintained at a temperature of from about −10° to about 10° F.

4. The process according to claim 2 in which said food packages introduced to said first zone are at a temperature between about 125° to about 180° F.

5. The process according to claim 3 in which said food packages introduced to said first zone are at a temperature between 140° and 160° F.

6. The process according to claim 1 in which the surface of said food packages is cooled to a temperature below about 90° F. in said first zone.

7. In freezer apparatus for freezing food packages and the like wherein the food packages are supported on trays circulated through the freezer, and including means for advancing said trays stepwise, intermittently during circulation thereof, the improvement which comprises nudger means operable during the lull in the intermittent motion of said trays to engage the lower edges of frozen food packages on a tray discharged from said freezer and in registry with said nudger means to break any frost bond by which said frozen food packages are adhered to the tray.

8. Apparatus according to claim 7 including abutment means spaced from said nudger means and operable to prevent a tray in registry therewith from being displaced from said means for advancing said trays by said nudger means.

9. Apparatus for use with freezer apparatus for freeing from a tray having a flange along an edge thereof a group of frozen food packages supported by said tray in side-by-side relation in alignment with said flange and adhered to said tray by a frost bond developed during passage of said tray and its contents through freezer apparatus which comprises an elongated nudger bar having a wedge-shaped leading edge for engaging the lower edges of the aligned frozen food packages on a tray discharged from a freezer and brought into alignment with said nudger bar, a pair of spaced rod means for supporting said nudger bar, means for slidingly supporting said rod means and about which said rod means pivot to raise said nudger bar during advancement thereof, and means connected to said rod means operable to advance said nudger bar into contact with the lower edges of frozen food packages on a tray in alignment therewith, said packages being elevated along said edges in contact with said nudger bar by the wedge-shaped leading edge thereof and by elevation of said nudger bar during its forward movement, whereby any frost bond between said frozen food packages and the supporting tray is broken, said flange on said trays preventing displacement of said packages from said tray by said nudger bar.

10. Apparatus according to claim 9 including a pair of abutments spaced from said nudger bar and operable to prevent said tray in alignment therewith from being displaced by said nudger bar.

11. In freezer apparatus for freezing food packages and the like wherein the food packages are advanced between a pair of freezing plates mounted for movement relative to one another between relatively open and closed positions and permitting stepwise advancement of the packages in the open position and compressing and freezing the packages in the closed position, the improvement which comprises freezing plates having a first portion into which unfrozen food packages are introduced and a second portion extending from said first portion toward the discharge end of said freezing plates, and means for refrigerating the second portion of said plates, whereby said plates in said second portion are at a substantially lower temperature than the temperature in said first portion.

12. Apparatus according to claim 11 in which said freezing plates in said second portion are formed of a relatively flat plate having superimposed thereon a corrugated plate to provide longitudinally extending passageways for refrigerant between said flat plate and said corrugated plate, and in said first portion comprise relatively flat plates, and means for introducing refrigerant to said passageways in said second portion of said freezing plates.

13. Apparatus according to claim 11 including a conduit for refrigerant extending transversely of said first portion of said freezing plates, said conduit carrying an amount of refrigerant to cool said first portion to a temperature below freezing but substantially higher than said second portion.

14. In freezer apparatus for freezing food packages and the like wherein a plurality of aligned food packages are supported on trays are circulated between a pair of freezing plates mounted for movement relative to one another between relatively open and closed positions and permitting stepwise advancement of the trays in the open position and compressing and freezing the packages in the closed position, including means for advancing said tray stepwise, intermittently during circulation thereof, the improvement which comprises freezing plates having a first portion into which trays containing frozen food packages are introduced and a second portion extending from said first portion toward the discharge end of said freezing plates, said freezing plates in said second portion formed of a relatively flat plate having superimposed thereon a corrugated plate to provide longitudinally extending passageways for refrigerant, said first portion comprises relatively flat plates, means for introducing refrigerant to the passageways of said second portion of said freezing plates whereby said plates in first zone are at a substantially higher temperature than the temperature in said second portion, an elongated nudger bar having a wedge-shaped leading edge for engaging the lower edges of the aligned frozen food packages on a tray discharged from said freezer and in alignment with said nudger bar during the lull in the intermittent motion of said trays, a pair of spaced rod means for supporting said nudger bar, means for slidingly supporting said rod means and about which said rod means pivot to raise said nudger bar during advancement thereof, and means connected to said rod means operable during the lull in the intermittent movement of said trays to advance said nudger bar into contact with the lower edges of frozen food packages on a tray in alignment therewith, said packages being elevated along said edges in contact with said nudger bar by the wedge-shaped leading edge thereof and by elevation of said nudger bar during its forward movement, whereby any frost bond between said frozen food packages and the supporting tray is broken.

15. Apparatus according to claim 14 including a pair of abutments spaced from said nudger bar and operable to prevent said tray in alignment therewith from being displaced by said nudger bar from said means for advancing said trays.

References Cited in the file of this patent
UNITED STATES PATENTS

| | | |
|---|---|---|
| 2,631,440 | Polk | Mar. 17, 1953 |
| 2,697,920 | Mackenzie | Dec. 28, 1954 |